United States Patent Office 3,651,179
Patented Mar. 21, 1972

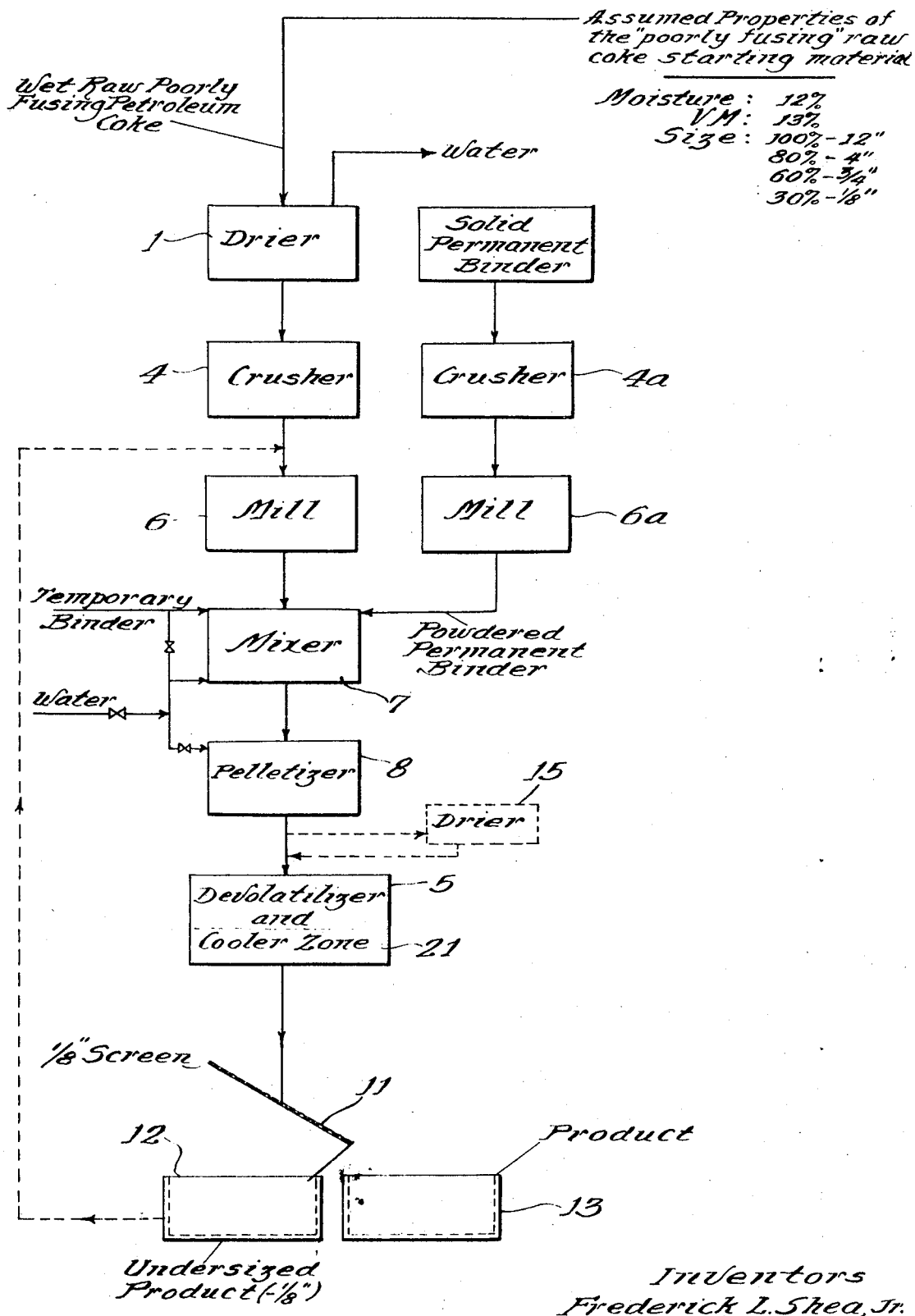

3,651,179
AGGLOMERATING OXIDIZED OR WEATHERED CARBONACEOUS MATERIAL USING POWDERED PITCH OR ASPHALT AS BINDER
Frederick L. Shea, Jr., 806 Wedgewood Drive, and Harry L. Hsu, 1608 Woodmont Drive, both of Johnson City, Tenn. 37601
Continuation-in-part of application Ser. No. 565,603, July 15, 1966. This application July 9, 1969, Ser. No. 842,822
Int. Cl. C09c 1/58; C10b 57/02, 57/06
U.S. Cl. 264—29
12 Claims

ABSTRACT OF THE DISCLOSURE

Conventionally granular carbon pellets are made from high volatile content carbonaceous material, such as raw petroleum coke having at least 9% volatile matter, by grinding, mixing with water and a temporary binder such as starch or sulphite liquors, pelletizing on a pelletizing disk and finally heating to about 1650° F. in an inert atmosphere. It has been found that if the carbonaceous material has been oxidized or badly weathered that strong pellets will not be produced in the conventional manner in spite of the fact that the oxidized or weathered material has a volatile matter content of at least about 9%. This problem is solved by adding more than one and up to twenty parts of a solid powdered (—20 mesh and fines) pitch or asphalt binder, having a softening point above about 150° F., to the mixture prior to pelletizing.

CROSS REFERENCE TO RELATED APPLICATION

This application is a continuation-in-part of patent application, Ser. No. 565,603, filed July 15, 1966, and now abandoned.

BACKGROUND OF THE INVENTION

(1) Field of the invention

This invention relates generally to a process for the manufacture of granular carbon pellets or bodies from poorly fusing carbonaceous starting materials. More specifically, this invention relates to a process for the manufacture of such pellets from a poorly fusing carbonaceous starting material having a volatile matter content of at least about 9% but which is, "poorly fusing," because it is weathered or oxidized. In the most preferred embodiment the invention relates to a method whereby poorly fusing raw petroleum coke, having a volatile matter content between about 9% and about 20% and derived by decoking of coke chambers from a delayed coking operation by either hydraulic or mechanical means, can be conveniently, efficiently and economically processed to give a maximum yield of granular carbon which will be eminently suitable for use in process industries such as the phosphorous industry and/or the calcium carbide industry which employ carbon as a reactant or reductant, or in the production of Soderberg anodes or pastes for the aluminum industry.

The suitability of granular carbon for any particular application is dependent upon the proposed end use for the carbon and involves several factors such as size, freedom from impurities, reactivity, volatile matter content, electrical resistivity, hardness, cost and other factors.

It is an object of this invention to produce granular carbon suitable for use in the three industries mentioned above as well as for other similar uses.

It is another object of this invention to provide a process whereby several of the properties of the granular carbon being produced may be controlled, depending upon the proposed end use for the carbon.

It is an additional object of this invention to produce such granular carbon from a poorly fusing carbonaceous starting material as previously indicated and to do this by means of a novel and economically advantageous process, and simultaneously therewith, to transform the poorly fusing carbonaceous starting material from a form generally unsuitable for industrial purposes into a commercially valuable industrial product. By "poorly fusing" is meant that the carbonaceous starting material in particulate form is incapable of forming an autogeneously-developed, permanent bond between the particles which is sufficiently strong for use in such industries as the production of phosphorous and calcium carbide, said bond referring to that developed in pellets formed using a temporary binder such as starch and water in a substantially pressureless forming operation, by heating and carbonizing at elevated temperatures.

(2) Description of the prior art

It is known that "delayed-coker" raw petroleum coke of suitable type is capable of "autogeneous" bonding, viz., of forming a strong permanent bond within itself and between the particles of same when heated and carbonized at elevated temperatures. Indeed, the findings and processing techniques of U.S. Pat. 3,077,439 are largely based upon this property of raw petroleum coke. This property of being capable of forming a strong bond autogeneously is primarily based upon "freshly produced" raw petroleum coke with a volatile matter (VM) content of at least about 9%, or raw petroleum coke with such a minimum VM content which has undergone little or no adverse "weathering." However, raw petroleum coke frequently is stored in large piles for varying periods of time while exposed to all types of weather conditions. During this period of storage its bonding or fusing power generally is adversely affected as the coke becomes oxidized or weathered to varying degrees. In these cases of weathering the strength of the bond that the raw pertoleum coke can autogeneously develop will generally vary inversely with the severity or degree of weathering of the coke. In some instances and for some end use applications, the raw petroleum coke will be so adversely affected that the raw petroleum coke will be incapable of being used in the process of that patent if reliance is placed on the strength of a bond developed solely by the raw petroleum coke itself, viz., the autogeneously developed bond. In such instances, it may be designated as "poorly-fusing." And it may be "poorly-fusing," because badly weathered or oxidized, despite the fact that its volatile matter content is well above the 9% (about) minimum referred to in said patent, e.g., it could be poorly-fusing and yet have a VM content from 12 to 20%.

It is known also that other carbonaceous materials besides the weathered raw petroleum coke just discussed, are "poorly-fusing" (the term "poorly-fusing" being intended to include carbonaceous starting materials which may fuse slightly or bond together weakly upon being heated); and also that such other "poorly-fusing" carbonaceous materials in their typical breeze or fine particulate form, are of very low economic value or unsuitable for industrial purposes.

SUMMARY OF THE INVENTION

It is an object of this invention to provide a novel, and economically feasible and advantageous process for preparing granular carbon pellets or formed carbon bodies from such poorly-fusing carbonaceous starting materials. It is a further object to do this without resorting to hot binder techniques, or techniques which employ substantial forming pressures. It is an additional object of this invention to accomplish the foregoing in a convenient and efficient manner.

It has been found that these and other objects may be achieved by carrying out the process of this invention. As indicated, the process of this invention comprises producing a granular carbon product from a pre-selected starting carbonaceous material. This product will typically be made up mostly of pellets larger than ⅛ inch in diameter and will have a volatile matter content less than about 6% and preferably between about 0% and about 4%. The VM content of the granular carbon product will depend upon the VM content of the formed green pellets and more will be said regarding this hereinafter. The pellets of the product will typically vary in size between about ⅛" or alternatively ¼" and about ¾" or 1" in diameter and can be used alone or in conjunction with other materials in process industries such as previously described.

If poorly-fusing delayed coker raw petroleum coke is employed as the starting material, it will generally have a volatile matter content (exclusive of moisture) between about 9% and about 20%, and more typically between about 9% and about 16%. Part or all of this starting material may be finer than ⅛" or ¼" or all or part may be larger than ¾" or 1", the processing steps of this invention permitting the use of starting materials of any size. Generally, however, with raw petroleum coke as the starting material, the process of this invention will be carried out on weathered or oxidized "run-of-pile" raw petroleum coke. Typically this starting material may possess about 12% moisture, about 13% volatile matter content (exclusive of moisture) and be of such a size that one hundred percent of it is smaller than 12 inches in diameter, about eighty percent is smaller than 4 inches, about sixty percent is smaller than ¾ inch and about thirty percent is smaller than ⅛ inch.

With such a typical starting material the general process comprises first sending the starting material through a drier where most or all of its moisture or water is removed. (The drying step may, of course, be omitted if the starting material possesses no or only little moisture. It may also sometimes be omitted even if the starting material possesses a considerable amount of moisture. This, however, is not the general or preferred procedure.) The dried coke is then typically passed through a crusher and/or a mill or other suitable apparatus where it is reduced to a fineness found suitable and necessary for making pellets such that at least about 40% and preferably at least about 50% of the comminuted particles pass through a 100 mesh Tyler screen. Of couse, if the particles are already this fine, or have been pre-screened to such fineness, then the crushing or milling step is unnecessary. It is preferred also that the comminuted particles be of a size such that about 70% pass through a 28 mesh Tyler screen and 100% through an 8 mesh Tyler screen. These reduced-in-size particles are then mixed with a suitable binder system, comprised of water, a temporary binder compatible with water (preferably starch), and a carbonaceous permanent binder, and are then agglomerated into pellets having diameters above ⅛ inch in diameter, such as between about ⅛" and about ¾" or 1" for the calcium carbide industry, or between about ¼" and about ¾" or 1" for the phosphorous industry. Analogous procedural steps may be followed in producing granular carbon pellets for the aluminum industry or for other uses, depending upon the size product desired.

After this the pellets are dried and then devolatilized in a devolatilizer. In some instances the drying of the pellets will be carried out in a devolatilizer of suitable design while in others a separate drier will be employed. These pellets are kept in the devolatilizer for lengths of time and at temperatures which affect many of their properties and which substantially reduce their volatile matter content (from that contained in the starting carbonaceous material and/or permanent binder) typically to between about 0% and about 6% after which they are cooled and discharged into suitable containers ready for shipment.

DESCRIPTION OF THE DRAWING

The process and various additional details and modifications thereof will become clearer from a consideration of the attached drawing which illustrates a flow sheet of the process wherein all of the carbonaceous starting material is poorly-fusing raw petroleum coke.

In the process shown the poorly-fusing, raw petroleum coke starting material, having the properties set forth in the top right-hand corner of the figure, (which properties are fairly representative of most of the run-of-pile raw petroleum cokes to be processed in accordance with the teachings of this invention) is passed to a drier 1, such as a rotary drier at a temperature of about 210° F. or higher, to rid the starting material of most or all of its moisture or water, so that the coke particles no longer stick together. Then the thus dried raw petroleum coke is passed to a crusher 4 to be reduced to an intermediate size.

These particles are then passed through a mill 6, such as a hammermill, wherein they are reduced in size to a fineness such that approximately 30% pass through a 200 mesh screen, 50% pass through a 100 mesh Tyler screen, 70% through a 28 mesh screen and 100% through an 8 mesh screen. The thus milled particles are thoroughly mixed with an aqueous temporary binder mixture or solution, such as of starch and water, and with a permanent binder. The permanent binder is in solid or lump form and is milled into a powder by means of crusher 4a and mill 6a. These materials are thoroughly blended in mixer 7 and are then passed to a substantially pressureless agglomerating means such as pelletizer 8, preferably of the disc type, which forms the mixture into agglomerates or pellets which may be varied widely in size but preferably between about ⅛" and about ¾" or 1" in diameter. These pellets are then passed into a devolatilzer 5 for suitable heat treatment. As indicated by the dotted lines, the pellets may sometimes be sent to a separate drier 15 to be dried before being sent to a devolatilizer, or they may be dried in the devolatilizer. The heat treated pellets or agglomerates, after having their VM content substantially reduced, such as to a point where their volatile content is between about 0% and about 6%, are then cooled. The cooling may be carried out in a cooling or cooler zone 21 which may comprise the base portion of the devolatilizer or it may be carried out partially therein and the rest outside of same, or it may substantially all be carried out in a unit separate from the devolatilizing unit.

In the process of the present invention a small percentage of undersized (such for example as —⅛" or —¼" as the case may be) product may be obtained due mainly to particle abrasion in the devolatilizer and cooling zone. It is therefore sometimes desirable to separate this small percentage of undesired particles from the main product having the proper desired size. This step is shown in the drawing wherein a screen 11 is employed to separate the undersized particles 12 from the properly sized pellets of the product 13. A ⅛" screen is employed in the process illustrated. It will be appreciated that a ¼" screen will be employed when the product size desired is +¼" and that also in many cases the product specifications will not require the use of any screen at this stage of the process.

The undersized product 12 in the process will not usually comprise more than a small percentage of the devolatilized product. These small amounts of undersized product may be utilized or integrated into the main process by adding them to the raw petroleum coke particles entering mill 6 or mixer 7. When so recycled the undersized devolatilized product can be incorporated into the subsequent steps of the process. The preferred alternative for accomplishing this is to add these particles to the materials going into the mill, as shown by the dotted lines in the process illustrated.

DESCRIPTION OF THE PREFERRED EMBODIMENTS

Te devolatilization step may be carried out in several types of devolatilizers, such as in a rotary kiln, or in a shaft kiln, or on a moving grate, or in any suitable carbonizing apparatus. Typical temperatures found preferable for carrying out the devolatilization of the pellets are in the region of about 900° C. (about 1650° F.) although temperatures as high as about 1100° C. (about 2000° F.) may sometimes be employed. Either reducing or inert devolatilizing atmospheres (substantially non-oxidizing) are necessary in the heating step of the pellets, in order to prevent or minimize any oxidation of the carbonaceous solids being processed. This condition can be readily provided by burning a fuel in air or oxygen, the fuel being present in excess. Any oxidation should be kept to a minimum for even mild oxidation can result in weak pellets. The maintenance of these conditions is most critical at temperatures typically below about 550° C., which is near the point at which the bond of many of the pellets made according to this invention becomes permanently "set."

As aforesaid, the formed green pellets may be carbonized in a rotary kiln, or in a shaft kiln, or on a moving grate, or in any suitable carbonizing apparatus. For best results, the carbonizing apparatus or devolatilizer 5 is so constructed, or so regulated, that the formed green pellets can be raised to the desired final carbonizing temperature in a well regulated manner. In other words, if the desired final temperature is 800° C. and the formed green pellets are at a temperature of 25° C. (77° F.) when they leave the pelletizer 8, and enter the devolatilizer 5, they preferably will be heated from the 25° C. temperature to the 800° C. temperature at a very closely controlled upheat rate.

Controlled upheat rates not exceeding about 600° C. per hour at temperatures below the "setting" temperature of about 550° C. may be employed. Higher rates may be used above this temperature. A typical rate in a vertical shaft furnace is room temperature to 500° C. in one hour and then to 850° C. in one-half hour. The particular upheat rate within the foregoing described ranges which will be chosen and employed will also be dependent upon the density, porosity, size, shape and VM content of the formed green pellets or bodies being processed. The VM content of the formed green pellets will depend upon the starting carbonaceous material employed and its VM content, the permanent binder employed and its VM content, and the relative proportions of these two materials.

The pellet forming step is preferably carried out on a pelletizing disc, inclined at an angle of about 45° and driven by a variable speed drive. A water spray is employed in the pellet forming step to assist in promoting the agglomeration of the mix. A scraper facing the disc insures the proper tumbling and agitation and mixing of the water with the particles to change the mix into pellets. The "balling" action and the size of the pellets obtained is controlled by the properties of the mix, the rate at which it is fed to the disc, the angle and speed of the disc, the amount of water used, and the position at which the feed is introduced into the disc or saucer. The control of these factors may, if desired, result in the production of pellets of a highly uniform size range. Or, the conditions may be varied, so that the size range of pellets produced may be quite broad. The pellets discharge from the disc onto a pellet chute by which they are channeled into a devolatilizer 5. Alternatively, as previously pointed out, the pellets may be sent first to a drier 15 which typically would be of the conveyor type and maintained at a temperature above 210° F. such as at 300–400° F. or higher to rid them of most of their moisture, before they are sent to the devolatilizer. (At higher temperatures an inert atmosphere is necessary.) This alternative depends somewhat on the design and type of devolatilizer employed and whether it is so constructed as to be able to function efficiently both as a drier or demoisturizer and as a devolatilizer.

By following the teachings of this invention an economical and efficient process for converting poorly-fusing carbonaceous starting materials, e.g. oxidized or badly weathered delayed coker raw petroleum coke into commercial products may be realized.

The permanent binder is relied upon, and generally employed in only such quantities, as is necessary to obtain the desired total permanent bond strength of the devolatilized pellet. Only relatively small proportions of permanent binder are necessary in order to obtain pellets of satisfactory or desired strength. At least sufficient permanent binder is employed so that it will contribute at least about 1.0% of the carbon in the final devolatilized granular carbon product and produce a carbon product suitable for industrial usage. In some cases because of the high coke yield of the permanent binder, the permanent binder will contribute much more than this minimum of 1.0%.

With regard to the mixing operation, it has been found that the particle size distribution of the carbonaceous starting material, and of the permanent binder, the types of binders, the ratios of binders to carbonaceous particles, and the procedures employed in mixing the binders with the carbonaceous particles all have an important bearing on the capability of carrying out the process in the desired manner and at the desired temperatures, or on the extent that the mixtures may be formed into pellets without employing substantial pressures and without employing elevated temperatures, as well as on their capability of being formed into pellets of the proper strength both before and after drying and devolatilization.

The temporary bonding agent or material employed in the process of the present invention should be one which will provide reasonably good pellet wet strength and dry green strength and involve no serious sticking problems. Any material compatible with water which will bond and hold the mixed ingredient materials together or provide pellets of sufficient wet strength, and which also provides pellets of adequate dry green strength for handling and devolatilizing after the water is driven off, is suitable. By compatible is meant materials which are emulsifiable with water, or suspendable or dispersible or soluble therein. A starch-water temporary binder is particularly suitable in the process of the present invention. Other temporary binder systems comprise asphalt emulsions, clay emulsions and mixtures of water with molasses or with refined or unrefined sulfite liquors. Mixtures of these binders may also be employed. If desired or convenient or necessary, the temporary bonding agent may be pre-dispersed or pre-mixed or pre-emulsified in water, using any convenient techniques to accomplish this including the use of elevated temperatures, before it is used in the temporary binder system of the present invention. The effectiveness of the temporary binders may vary, as may also the quantities required; the temporary binder used, therefore, will depend upon these factors and product requirements and also cost considerations.

The permanent binder employed is "carbonaceous" in nature, viz. will yield carbon when heated to provide a carbon bond between the poorly-fusing carbon particles and typically has a coke yield of at least 20% when heated to decomposition and devolatilization temperatures in a neutral or inert atmosphere. (It should be noted that the coke yield of a binder varies somewhat depending upon the temperatures and heating rates used. The 20% figure is meant to indicate the coke yield of a binder as obtained when the pellets are heated or devolatilized at a reasonable rate and under reasonable conditions as described herein.) Coal tar pitch, petroleum pitch or asphalt in powdered form and of such a fineness that at least about 75% of the particles pass through a 65 mesh Tyler screen and at least about 90% of the particles pass through a 20 mesh Tyler screen are typical permanent binders employed herein. Typical asphalt materials used are those classified as pyrogeneous asphalts of petroleum origin including residual oils, pressure tars and residual asphalts, and natural asphalt materials such as gilsonite. Mixtures of solid permanent binders may be used. Typical particle sizes for the solid permanent binder materials as used in the present invention are as follows:

| Tyler mesh size | Solid permanent binder (percent) | |
|---|---|---|
| | Asphalt | Pitch |
| Minus 10 | 100 | 100 |
| Minus 10, plus 20 (−10+20) | 2.3 | 0.1 |
| −20+65 | 19.6 | 3.4 |
| −65+100 | 30.0 | 5.7 |
| −100 | 48.0 | 90.7 |

Additional typical particle size data for the solid permanent binder material is set forth hereinafter following Example 10. It should of course be realized that the particle sizing of the permanent binder may be varied provided that substantially all of same passes through a 10 mesh Tyler screen, about 0% to about 10% it retained on a 20 mesh Tyler screen, about 2% to about 25% is retained on a 65 mesh Tyler screen, about 6% to about 52% is retained on a 100 mesh Tyler screen, the balance of the particles finer than 100 mesh possessing a natural breakdown distribution such as results from being subjected to a mechanical milling operation, e.g. as in mill 6a.

It is preferred that the solid permanent binders employed have relatively high softening points or ranges, such as a minimum of 150° F. and preferably above 200° F. Typical softening points of solid permanent binders which may be used in the invention are as follows.

Permanent binder: Typical softening point[1] ° F.
Pitch _____ 212
Asphalt _____ 325

[1] Softening point or melting point of these and any other permanent binders employed in this invention determined by Cube in Air Method, ASTM-D2319.

As previously indicated, the amount of permanent binder employed will vary, depending largely upon the bonding power of the binder itself and will depend also on the condition or "fusibility" of the carbonaceous starting material. The pitch and asphalt are approximately equivalent to each other in bonding power. Three to 10 parts of pitch or asphalt per 100 parts of poorly-fusing carbonaceous starting material are typically sufficient to produce devolatilized pellets having satisfactory strength, stability and abradability characteristics. One part or less of pitch or asphalt will seldom be desirable because if no more than this amount of permanent binder is needed to make pellets of good strength, it indicates that the starting carbonaceous material (such as raw petroleum coke) possesses sufficient autogeneous bonding power that the process can be carried out without any permanent binder. Binder quantities in excess of 20 parts of pitch or asphalt per 100 parts of starting carbonaceous material will rarely be employed because they are generally unnecessary, because of the effect such higher quantities have on the intrinsic properties of the product pellets (for example, their resistivity and reactivity and ash content, which properties also affect their suitability for industrial usage), and also because of economic reasons.

Improper proportions or ratios of the various materials in making up the pellets result in either the inability to form pellets at all, or the formation of pellets lacking the proper size, or the formation of pellets lacking sufficient strength. The strength of the dry "green" (viz not yet devolatilized) pellets depends upon the ratio of temporary bonding material, in the binder system, to starting carbon particles and permanent binder. The water content of the mix primarily controls the pelletizing characteristics of the mixture, such as rate of pellet development and wet pellet strength. When employing a starch based binder system, mixtures comprising by weight 100 parts of starting cabonaceous particles and carbonaceous permanent binder, 20 to 40 parts water and 0.8 to 2.0 parts starch function best for the pellet forming and subsequent steps; mixtures comprising 100 parts of carbon particles and permanent binder, 15 to 50 parts by water, and 0.8 to 3.0 and higher parts of starch are operative; however, no more than about 2.0 parts of starch are generally necessary, while generally at least 20 parts of water will be used. These figures are based upon analysis of the pellets. With reference to the water, they include the water added by the water spray during the pellet forming operation which generally approximates the amount of water employed in the mixing operation, or typically about 15 parts of water in each step. They also include any water which might be employed in another manner such as for first making an aqueous dispersion or suspension or solution of the temporary binding material before using it in the binder system. At least 10 parts of water will generally be used during the pelletizing step. The quantities of other temporary binders used will vary depending upon their bonding strength relative to starch, the bonding power of starch typically being superior to that of the other binders.

Premixing the temporary bonding material with the carbonaceous starting material and permanent binder in a mixer prior to pelletizing typically results in dry green pellet strengths much higher than those obtained where all of the temporary binder is sprayed onto the coke during the pelletizing or pellet forming operation and is, therefore, preferred to the latter although the latter procedure is also considered within the scope of the invention.

In a preferred procedure the carbonaceous starting material is premixed with the powdered permanent binder and with a portion of the total pellet water requirement for about 1 minute. Then the starch, or other temporary binder, separately mixed with another portion of the pellet water requirement is added to the pre-wetted carbonaceous starting material and permanent binder and this batch is mixed for approximately 5 more minutes. The mixture is then cycled to the pelletizer where the remaining water is used to assist in the pellet forming operation. Another very good procedure is first dispesring the powdered permanent binder in a solution or suspension of the temporary binder in water (e.g. starch and water) and then mixing this dispersion with the carbonaceous starting material. Other suitable mixing methods include mixing the starch (or other temporary binder) with about one-half of the total pellet water requirement, then adding this to the stating carbonaceous material and permanent binder and mixing the entire batch for about 5 minutes and then employing the remaining portion of the water requirement during the pelletizing step. Another procedure is to dry blend the starch (or other temporary binder) with the carbonaceous starting material and the powdered permanent binder for about one minute, then add about one-half the total water requirement of this mixture to this blend and mix the entire batch for about five minutes, and then employ the remaining portion of the water requirement during the pelletizing step. Suitably placed "gate" controls or valves may be employed to provide for any of these alternative mixing methods.

As stated previously, the particle size distribution of the carbonaceous material mixed with the binder is also important with respect to the subsequent pellet forming operation. When approximately 40% or more of the particles are finer than 100 mesh, satisfactory pellets with respect to strength, size, etc., are produced. When the coke has less than about 40% of particles finer than 100 mesh, poor agglomeration and poor strength occurs. The balance of the particles employed in making the pellets may have a wide range of sizes. A typical example might show substantailly 100% minus 8 Tyler mesh and 70% minus 28 Tyler mesh. The particle size of the permanent binder should be consistent with the foregoing and as previously indicated, should be at least about 75% minus 65 mesh Tyler screen and at least about 90% minus 20 mesh Tyler screen.

With regard to the method employed for producing agglomerates or pellets of the desired size from these finely ground particles, it is preferred, as stated previously, to form the fine particles and binders into pellets on a pelletizing disc, said forming step being a substantially pressureless operation. Size enlargement or agglomerating techniques such as by drum-rotation may also be employed to form the pellets of this invention. It is also an important characteristic of the present invention that the agglomerating step is carried out under certain conditions such that the required amount of water to make pellets is maintained. This means temperatures below the boiling point of water because, otherwise, the water would evaporate. Typically the temperature at which the pelletizing step is carried out is much lower than the boiling point of water, for example, at temperatures between 60 and 90° F. or more broadly between about 40° F. and about 100° F. In other words, the pelletizing step is generally carried out at normally encountered room or outdoor temperatures. If the pelletizing is carried out outdoors in the winter time the temperature should be at least above 32° F., otherwise, the water would freeze and the "required amount of water to make pellets" would not be maintained. The pelletizing will rarely be carried out at temperatures approaching the boiling point of water because then it is difficult to maintain "the required amount of water to make pellets." It should be noted that the ambient pelletizing temperature which is normally and preferably used is generally considerably lower than the softening or melting temperatures of the solid permanent binders employed in the invention. In other words, the process is not based upon and does not involve or make use of a hot melted binder in the forming step, and the permanent binder is included in the pellet forming step for subsequent utility in the process during the devolatilization step rather than as an aide in the pellet forming step.

The following examples will further illustrate the invention. In all of these examples, (except the Control) the formulation was based on 100 parts of the starting carbonaceous particles plus permanent binder, 1.5 parts of starch and 30 total parts of water, unless indicated otherwise. The materials were pelletized at room temperature and then heated to 850° C. in a manner as previously discussed.

Delayed-coker raw petroleum coke having a volatile matter (VM) content of 11.7% and which was badly-weathered and poorly-fusing was milled to the following size distribution (all screen sizes-Tyler series):

| | Percent |
|---|---|
| Minus 8 | 100 |
| Minus 28 | 99 |
| Minus 65 | 95 |
| Minus 100 | 85 |
| Minus 200 | 60 |

The raw petroleum coke particles were mixed with the starch and water, and were then pelletized and devolatilized to a volatile matter content of about 3.5%, and the pellets tested for their abrasive strength. Example 1 gives the data for this "Control" run wherein no permanent binder was employed.

Example _____ (Control) 1
Coke-permanent binder ratio _____ 100/0
Abrasive strength [1]:
    Stability (+4 m.) % _____ 35.2
    Abradability (−100 m.) % _____ 54.2

[1] The foregoing abrasive strength test results and others described herein were carried out as follows.

The devolatized coke pellets produced in any given example were crushed in a jaw crusher and the crushed sample screened to a ⅜″ by ¼″ fraction. The amount of the sample crushed was large enough to insure at least 500 grams of the desired size. A mixture of equal volumes of ¾″ and ½″ porcelain balls with a total weight of 3500 grams was also prepared. These 3500 grams of porcelain balls and 500 grams of the sized coke were placed in a steel tumbling chamber 12″ in diameter by 18″ deep. The tumbling chamber was then rotated 500 revolutions end over end about a center diameter at the rate of 30 revolutions per minute. After tumbling, the chamber was allowed to remain stationary for about 5 minutes to permit the dust to settle. It was then opened to remove the coke and the porcelain balls, its interior being brushed to remove all of the dust. The porcelain balls were separated from the coke on a ⅜″ screen. The coke was then screened using No. 4 and No. 100 mesh Tyler sieves on a rotap for one minute. The portion of the coke which did not pass through the 4 mesh screen (+4 m.) was taken as a measure of the coke's stability, while the portion of the coke which passed through the 100 mesh screen (−100 m.) was taken as the measure of the coke's abradability. These were calculated as follows:

$$\frac{\text{Wgt. of coke on 4 mesh}}{500} \times 100 = \text{Wgt. percent} + 4 \text{ mesh} = \text{Stability}$$

$$\frac{\text{Wgt. of coke through 100 mesh}}{500} \times 100 = \text{Wgt. percent} - 100 \text{ mesh} = \text{abradability}$$

It may be said that generally in order to have a product suitable for industrial usage as described herein, such as for use in the production of phosphorus and calcium carbide, the stability of the granular carbon product should be at least about 55% and the abradability no higher than about 35%.

The following examples compare the results of Example 1 (the control) with an example using powdered pitch as the permanent binder. The mixing and pelletizing were carried out at room temperature. The petroleum coke used in Example 2 was the same as in Example 1. The pitch used was a vacuum impregnating pitch having a softening point of 100° C. (or 212° F.) and milled so that 92% passed a 65 mesh screen and 100% passed a 10 mesh screen.

| Example | Coke-pitch ratio | Abrasive strength (percent) | |
|---|---|---|---|
| | | Stability (+4 m.) | Abradability (−100 m.) |
| 1 (control) | 100/0 | 35.2 | 54.2 |
| 2 | 95/5 | 80.0 | 17.3 |

The improvement in abrasive strength by using only 5 parts of the pitch was marked and it will be noted that a product eminently suitable for industrial usage was obtained.

Another series of test runs were made in which pitch and asphalt were used as the permanent binder. The petroleum coke was milled to the size used in Examples 1-2 but was only "mildly-oxidized" rather than "badly-weathered." The pitch used was identical to that used in Example 2, while the asphalt used had a softening point of 325° F. and was milled so that 75% passed a 65 mesh screen and 100% passed on a 10 mesh screen. The mixing and pelletizing steps were carried out at room temperature.

| Example | Coke | Permanent binder | Temporary binder | Abrasive strength (percent) | |
|---|---|---|---|---|---|
| | | | | Stability (+4 m.) | Abradability (−100 m.) |
| 3 | 90 | 10 pitch | 1.5 starch | 78.1 | 18.7 |
| 4 | 95 | 5 pitch | do | 83.0 | 14.3 |
| 5 | 95 | 5 asphalt | do | 77.0 | 20.0 |
| 6 | 90 | 10 asphalt | 3.0 Norlig* | 79.4 | 19.9 |
| 7 (control) | 100 | | 1.5 starch | 60.0 | 35.0 |

*Norlig is a trademark of the American Can Company for an unrefined ligno-sulfonate and suggested for use as a binder or filler or dispersing agent.

The improvement in abrasive strength by the use of relatively small quantities of pitch and asphalt permanent binders was pronounced, although relatively not as great as brought about by the pitch in Example 2 for the "badly-weathered" raw petroleum coke.

Sometimes an increase in proportion or quantity of permanent binder results in an increase in abrasive strength of the pellets and sometimes it does not, but actually weakens the pellets. This is apparent from the foregoing examples. The amount of binder to be used for any given system, therefore will depend upon the particular starting material used and permanent binder used and will generally be arrived at through routine experimentation within the suggested guidelines of this invention.

Having thus described the nature of our invention and the uses for the product of our invention, but being limited only by the appended claims with respect to the scope of the invention, we claim:

1. A process for producing a granular carbon product suitable for industrial usage having a volatile matter content between about 0 and about 6 percent and a particle size above about ⅛ of an inch in diameter from a poorly fusing, because weathered or oxidized, solid carbonaceous starting material having a volatile matter content of at least about 9% which comprises:
   (A) crushing and milling the starting material to a particulate condition such that at least about 40% of the particles pass through a 100 mesh Tyler screen and substantially all of the particles pass through an 8 mesh Tyler screen;
   (B) mixing at a temperature below 150° F., a total of 100 parts of these particles and of a solid, powdered carbonaceous permanent binder with a temporary binder system consisting of 15 to 50 parts of water and at least 0.8 part of a temporary bonding material compatible with water selected from the group consisting of starch, asphalt emulsion, clay emulsion, molasses, refined and unrefined sulfite liquors and mixtures of same, more than one and up to about 20 parts of the solid, powdered carbonaceous permanent binder, per 100 parts of the poorly fusing starting material, being employed, said powdered permanent binder also having a softening point above about 150° F. and being selected from the group consisting of pitch and asphalt and mixtures thereof, so that said permanent binder contributes at least about 1.0% of the carbon in the granular carbon product, said permanent binder also having a cumulative particle size analysis such that substantially all of same passes through a 10 mesh Tyler screen, about 0% to about 10% is retained on a 20 mesh Tyler screen, about 2% to about 25% is retained on a 65 mesh Tyler screen, about 6% to about 52% is retained on a 100 mesh Tyler screen, and also a particle size such that the balance of particles finer than 100 mesh possesses a natural breakdown distribution such as would result from being produced in a mechanical milling operation;
   (C) agglomerating the mixed components of step B into pellets above about ⅛ inch in diameter by means of a substantially pressureless pelletizing operation carried out under temperature conditions such that the solid permanent binder remains unsoftened and the required amount of water to make pellets is maintained, the said 15 to 50 parts of water of step B being based upon analysis of the pellets after step C and including any water being used in the temporary bonding material and also any water used in this agglomeration step; and
   (D) devolatilizing in a substantially non-oxidizing atmosphere to a temperature between about 650° C. and about 1100° C. the pellets of step C until their volatile matter content is substantially reduced and is between about 0 and about 6 percent; the utility of the temporary binder system arising in the process primarily during step C, and the utility of the permanent binder arising in the process primarily during step D.

2. A process according to claim 1 wherein the carbonaceous permanent binder has a coke yield of at least 20%.

3. A process according to claim 1 wherein the poorly-fusing carbonaceous starting material is delayed coker poorly agglutinating raw petroleum coke having a volatile matter content between about 9 and about 20%.

4. A process according to claim 1 wherein the pellets of step C are dried in a separate drier prior to being devolatilized.

5. A process according to claim 1 wherein said poorly-fusing carbonaceous starting material is moist and wherein moisture is removed from said material in a drying operation prior to step A.

6. A process according to claim 1 wherein from about 20 to about 40 parts of water per 100 parts of poorly-fusing carbonaceous starting material and permanent binder are employed in the binder system and wherein at least 10 of the parts of said water is added during the pelletizing operation.

7. A process according to claim 1 wherein the temporary bonding material is thoroughly dispersed in water before it is employed in the binder system.

8. A process according to claim 1 wherein the temporary bonding material is starch and wherein from about 0.8 to about 3.0 parts of starch per 100 parts of poorly-fusing carbonaceous starting material and permanent binder are employed.

9. A process according to claim 1 wherein the pelletizing operation is carried out at ambient temperature.

10. A process according to claim 1 wherein the permanent binder is first dispersed in a suspension of starch and water before being mixed with the poorly-fusing carbonaceous starting material.

11. A process for producing a granular carbon product suitable for industrial usage having a volatile matter content between about 0 and about 6 percent and a particle size above about ⅛ of an inch in diameter from a poorly fusing, because weathered or oxidized, solid carbonaceous starting material having a volatile matter content of at least about 9% and which possesses a particle size such that at least about 40% of the particles pass through a 100 mesh screen and substantially all of the particles pass through an 8 mesh screen which comprises:
   (A) Mixing, at a temperature below 150° F., a total of 100 parts of these particles and of a solid powdered, carbonaceous permanent binder with a temporary binder system consisting of 15 to 50 parts of water and at least about 0.8 part of a temporary bonding material compatible with water selected from the group consisting of starch, asphalt emulsion, clay emulsion, molasses, refined and unrefined sulfite liquors, and mixtures of same, more than one and up to about 20 parts of the solid, powdered carbonaceous permanent binder, per 100 parts of the poorly fusing starting material, being employed, said powdered permanent binder also having a softening point above about 150° F. and being selected from the group consisting of pitch and asphalt, and mixtures thereof, so that said permanent binder contributes at least about 1.0% of the carbon in the granular carbon product, said permanent binder also having a cumulative particle size analysis such that substantially all of same passes through a 10 mesh Tyler screen, about 0% to about 10% is retained on a 20 mesh Tyler screen, about 2% to about 25% is retained on a 65 mesh Tyler screen, about 6% to about 52% is retained on a 100 mesh Tyler screen, and also a particle size such that the balance of particles finer than 100 mesh possesses a natural breakdown distribution such as would result from being produced in a mechanical milling operation;

(B) Agglomerating the mixed components of step A into pellets above about ⅛ inch in diameter by means of a substantially pressureless pelletizing operation carried out under temperature conditions such that the solid permanent binder remains unsoftened and the required amount of water to make pellets is maintained, the said 15 to 50 parts of water of step (A) being based upon analysis of the pellets after step (B) and including any water being used in the temporary bonding material and also any water used in this agglomeration step; and (C) devolatilizing in a substantially non-oxidizing atmosphere to a temperature between about 650° C. and about 1100° C. the pellets of step B until their volatile matter content is substantially reduced and is between about 0 and about 6 percent; the utility of the temporary binder system arising in the process primarily during step (B), and the utility of the permanent binder arising in the process primarily during step (C).

12. A process according to claim 11 wherein the poorly-fusing carbonaceous starting material is delayed-coker, poorly-agglutinating, raw petroleum coke having a volatile matter content between about 9 and about 20%, and wherein the amount of solid powdered permanent binder employed is between about 3 and about 10 parts per 100 parts of the raw petroleum coke.

References Cited
UNITED STATES PATENTS

| | | | |
|---|---|---|---|
| 3,533,961 | 10/1970 | Voet et al. | 23—314 |
| 3,427,148 | 2/1969 | Peters | 75—4 |
| 1,276,429 | 8/1918 | Smith | 44—23 |
| 2,370,060 | 2/1945 | Mead | 44—23 |
| 3,077,439 | 2/1963 | Shea, Jr. et al. | 264—29 |
| 3,304,186 | 2/1967 | Limes et al. | 106—58 |

DONALD J. ARNOLD, Primary Examiner

J. H. MILLER, Assistant Examiner

U.S. Cl. X.R.

23—209.1, 314; 44—24; 264—117